(12) United States Patent
Martinsson et al.

(10) Patent No.: US 8,622,183 B2
(45) Date of Patent: Jan. 7, 2014

(54) SIZE AND WEIGHT SAVING CLUTCH DRUM OF A CENTRIFUGAL CLUTCH

(75) Inventors: Pär Martinsson, Jönköping (SE); Thomas Englund, Göteborg (SE)

(73) Assignee: Husqvarna AB, Huskvarna (SE)

( * ) Notice: Subject to any disclaimer, the term of this patent is extended or adjusted under 35 U.S.C. 154(b) by 361 days.

(21) Appl. No.: 12/809,966

(22) PCT Filed: Dec. 21, 2007

(86) PCT No.: PCT/SE2007/001143
§ 371 (c)(1),
(2), (4) Date: Sep. 22, 2010

(87) PCT Pub. No.: WO2009/082276
PCT Pub. Date: Jul. 2, 2009

(65) Prior Publication Data
US 2011/0005888 A1 Jan. 13, 2011

(51) Int. Cl.
F16D 67/02 (2006.01)
F16D 43/18 (2006.01)
F16D 13/62 (2006.01)
F16D 49/08 (2006.01)
F16D 65/10 (2006.01)

(52) U.S. Cl.
USPC ............... 192/17 R; 192/103 B; 192/107 T; 188/77 W; 188/218 R

(58) Field of Classification Search
USPC ..... 192/105 CD, 103 B, 17 R, 107 T; 74/449; 188/77 W
See application file for complete search history.

(56) References Cited

U.S. PATENT DOCUMENTS

| | | | | |
|---|---|---|---|---|
| 3,519,037 A | * | 7/1970 | Linkfield | 83/821 |
| 3,677,380 A | * | 7/1972 | Kirschey | 192/105 BA |
| 3,680,674 A | * | 8/1972 | Horstman | 192/105 BA |
| 3,712,438 A | * | 1/1973 | Roddy et al. | 192/105 CD |
| 4,006,528 A | * | 2/1977 | Katsuya | 30/276 |
| 4,367,813 A | * | 1/1983 | Wieland et al. | 192/17 R |
| 4,962,617 A | * | 10/1990 | Tilders et al. | 451/359 |
| 5,042,626 A | * | 8/1991 | Dohse et al. | 477/192 |
| 6,253,896 B1 | | 7/2001 | Notaras et al. | |
| 6,857,515 B2 | | 2/2005 | Barron et al. | |

FOREIGN PATENT DOCUMENTS

| EP | 0019583 A1 | 11/1980 |
|---|---|---|
| WO | 2009082276 A1 | 7/2009 |

OTHER PUBLICATIONS

International Search Report, International Application No. PCT/SE2007/001143, Jun. 26, 2008, pp. 1-3.
International Preliminary Report on Patentability, International Application No. PCT/SE2007/001143, Mar. 25, 2010, pp. 1-6.
English translation of EP0019583 downloaded Feb. 11, 2013.

* cited by examiner

*Primary Examiner* — Richard M. Lorence
(74) *Attorney, Agent, or Firm* — Novak Druce Connolly Bove + Quigg LLP

(57) ABSTRACT

The present invention provides a clutch drum (7) being a part of a centrifugal clutch (4) for an internal combustion engine (1). The centrifugal clutch (4) is arranged to transmit a rotational motion of a crank shaft (2) at higher engine speed and to declutch at lower engine speed. The clutch drum (7) includes a peripheral portion (8), with thickness B, which is arranged to be engaged on the inside by weighted arms of a driving disc (5) at higher engine speed and the clutch drum further includes an end portion (9), with thickness A, joining a drum hub (13) and the peripheral portion (8), and the thickness A is less than the thickness B.

22 Claims, 5 Drawing Sheets

US 8,622,183 B2

SIZE AND WEIGHT SAVING CLUTCH DRUM OF A CENTRIFUGAL CLUTCH

TECHNICAL FIELD

The present invention relates to a clutch drum being part of a centrifugal clutch for an internal combustion engine, the centrifugal clutch being arranged to transmit a rotational motion of a crank shaft at higher engine speed and to declutch at lower engine speed, the clutch drum comprising a peripheral portion, with thickness B, which is arranged to be engaged on the inside by weighted arms of a driving disc at higher engine speed, and an end portion, with thickness A, joining a drum hub and the peripheral portion.

BACKGROUND

In most hand-held power tools a centrifugal clutch is interposed between a driving engine and the actual tool. This is the case where the engine is an internal combustion engine. At lower engine speed the centrifugal clutch is disengaged and the tool is inactive. When the driven part of the tool, e.g. a saw chain, is to be activated the engine rpm is increased and this increases the centrifugal force acting on a movable member of the centrifugal clutch and clutch engagement results.

Typically, such a centrifugal clutch has a driving disc, fixedly connected to the crank shaft via a hub, said driving disc having weighted arms or shoes. The centrifugal clutch further comprises a cup shaped clutch drum, surrounding the driving disc. The clutch drum is fixedly connected to a drum hub, which in turn is drivingly connected to a driven implement or tool. The cup shaped clutch drum is engaged by the weighted arms of the driving disc at higher engine speed and a rotational motion can be transmitted to the tool or implement via said drum hub.

For a hand-held power tool weight is a prime concern as the operator carries the tool during work. Every gram that can be saved is therefore important. Also the size of the tool is very important to make the tool more manoeuvrable and light. Therefore these tools are normally driven by compact and light two stroke engines.

Typically, the clutch drum is formed by drawing sheet metal with a thickness of approximately 1.8 mm. This thickness is used so that the peripheral portion can withstand the load from the weighted arms at maximum engine speed.

For a chainsaw the minimum width of the clutch drum is limited by a necessary minimum width of an outer cylindrical area of the peripheral portion contacted by a brake band. Commonly, the brake band is freely wound around the peripheral portion of the clutch drum so as to being able to instantly stop the clutch drum, and thereby also the chain, through friction, when the chain brake is actuated.

A disadvantage of the aforementioned clutch drum is its rather high weight and its large width.

SUMMARY

It is an object of the present invention to provide a clutch drum with reduced width and weight.

Another object of the present invention is to provide a hand-held power tool with reduced width and weight, taking advantage of the reduced width of the clutch drum.

It is also an object of the present invention to provide a hand-held power tool working farther from the resonant frequency of the crank shaft system.

These objects are reached by a clutch drum of the type mentioned initially, wherein the thickness of the end portion, A, is less than the thickness of the peripheral portion, B.

Reducing the thickness A means that the total width of the clutch drum and the centrifugal clutch can be reduced. Thereby the weight of the centrifugal clutch can be reduced and also the width and weight of the whole hand-held power tool. This implies a light weight and versatile hand-held power tool, being easy to operate. Also, reducing the width of the centrifugal clutch enables a shorter crankshaft, which implies that the resonant frequency of the crank shaft system is displaced away from the working frequency. More specifically, the resonant frequency is shifted upwards.

Furthermore, reducing the width of the centrifugal clutch enables its centre of gravity to be displaced towards the centre of gravity of the crank shaft, which also implies the resonant frequency of the crank shaft system to be shifted upwards. Moreover, the reduced weight of the centrifugal clutch also contributes to the shifting upwards of the resonant frequency. Running farther from the resonant frequency is very beneficial for a hand-held power tool since it implies less vibration, less noise and an increased service life time.

DETAILED DESCRIPTION

Figure 1:
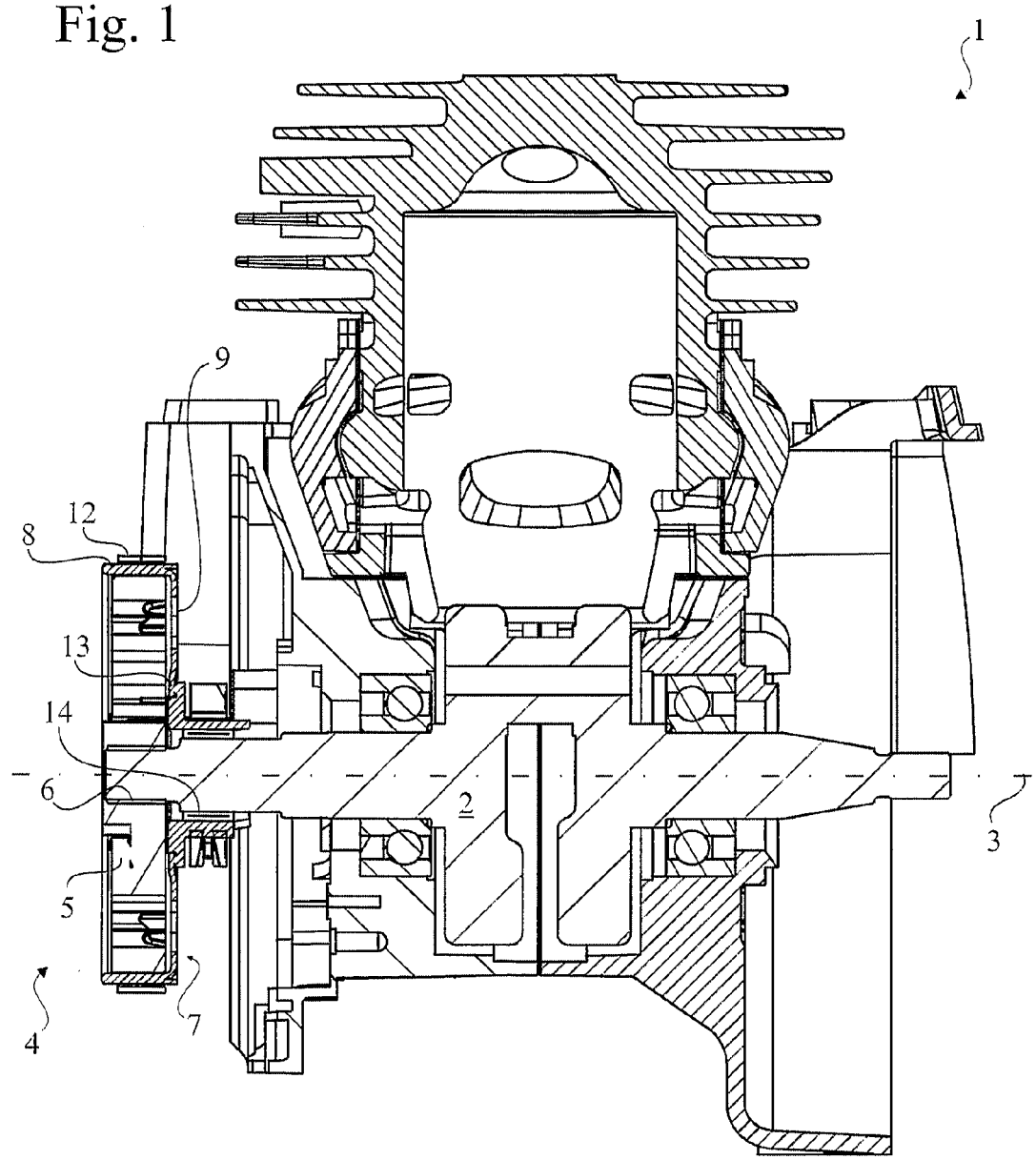
FIG. 1 is a cross sectional view of an internal combustion engine 1 and a centrifugal clutch 4.

FIG. 1 shows a cross sectional view of an internal combustion engine 1 with a crank shaft 2 being connected to a centrifugal clutch 4. The centrifugal clutch 4 has a driving disc 5, fixedly connected to the crank shaft 2 via a hub 6, said driving disc 5 having weighted arms or shoes. The centrifugal clutch 4 further comprises a cup shaped clutch drum 7, surrounding the driving disc 5. The clutch drum 7 comprises a cylinder shaped peripheral portion 8 disposed so as to having a central axis along the central axis 3 of the crank shaft 2, and an end portion 9 forming a bottom of said clutch drum 7. The end portion 9 is fixedly connected to a drum hub 13 at its centre, which drum hub 13 being mounted for rotation about the crank shaft 2 and is journaled in a needle bearing 14 or ball bearings. Alternatively, the drum hub 13 can be arranged to be fixedly mounted on an output shaft, e.g. by a spline connection. This is often the case for trimmers. The drum hub 13 can further be connected to a drive sprocket 15 (FIG. 2) for driving a saw chain, said drive sprocket 15 (FIG. 2) can e.g. be a rim sprocket, which is arranged to be sideways displaceable and drivingly connected by e.g. splines to the drum hub 13. Alternatively, the drive sprocket 15 (FIG. 2) can be e.g. a spur sprocket, which means the drum hub 13 is rigidly and directly connected to the saw chain, having no other transmitting means interposed between the drum hub 13 and the saw chain. Preferably, the drum hub 13 and the spur sprocket are cast in one piece. Alternatively, the drum hub 13 can be connected to a belt pulley intended to drive a belt for a cut off saw. At higher engine speed the weighted arms or shoes of the driving disc 5 are forced radially outwards by the centrifugal force to the extent of engaging the inside of the peripheral portion 8, thus permitting a rotational motion of the driving disc 5 to be transmitted via the clutch drum 7 and the drum hub 13, to the drive sprocket 15 and the saw chain or to drive the belt pulley to a cut off saw. For the trimmer the clutch drum 13 drives the output shaft of the trimmer. A brake band 12 can be freely wound around the outer surface of the peripheral portion 8 so as to being able to stop the clutch drum 7, and thereby also e.g. a saw chain, through friction, when actuated. Since the radius where the peripheral portion 8 meets the end portion 9 is made very small, almost the full width of the radially outer surface of the peripheral portion 8 can be used as contact surface for the brake band 12. This allows the width of the peripheral portion 8 to be smaller compared to the conventional case, still sustaining braking efficiency. Reducing the width of the peripheral portion 8 and the thickness of the end portion 9 compared to a conventional clutch drum 7, implies a decrease of weight of the clutch drum 7 and the centrifugal clutch 4, which also enables a decrease of weight of the crank shaft 2 and possibly of the crank shaft bearings. This further enables a light weight and versatile hand-held power tool, being easy to operate.

Figure 2:
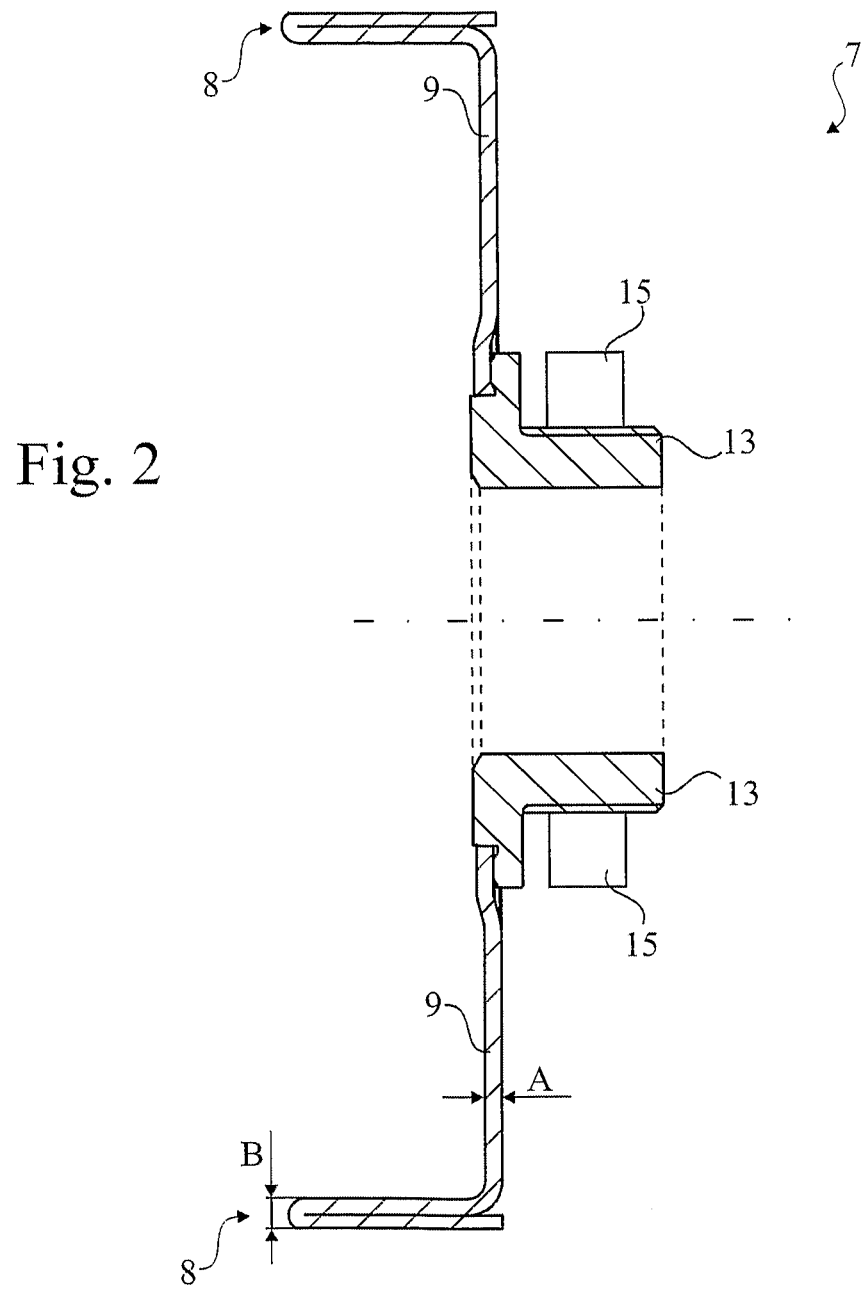
FIG. 2 is a cross sectional view of a clutch drum 7 according to a preferred embodiment of the invention.

FIG. 2 shows a clutch drum 7, a drum hub 13 and a drive sprocket 15 of a centrifugal clutch 4 according to a preferred embodiment of the invention. The clutch drum 7 is similar to the one described with reference to FIG. 1 and comprises an end portion 9 and a peripheral portion 8. Additional operations, such as drawing or folding, have been applied to the sheet metal of the peripheral portion 8, so as to form a peripheral portion 8 being composed of two layers, one radially outer layer and a second radially inner layer. The sheet metal of the clutch drum 7 has the thickness 1.0 mm, which implies that the peripheral portion 8 has the total thickness 2.0 mm and the end portion 9 has the thickness 1.0 mm. The thickness of the end portion 9 has proved to be sufficient although it is about half the thickness of a conventional end portion. The thickness of the end portion 9 can in fact be reduced by e.g. another 0.2 mm by machining, e.g. by turning in a lathe, still being sufficient. Since sheet metal of less thickness can be used with this embodiment, the cost of material can be reduced.

Figure 3:
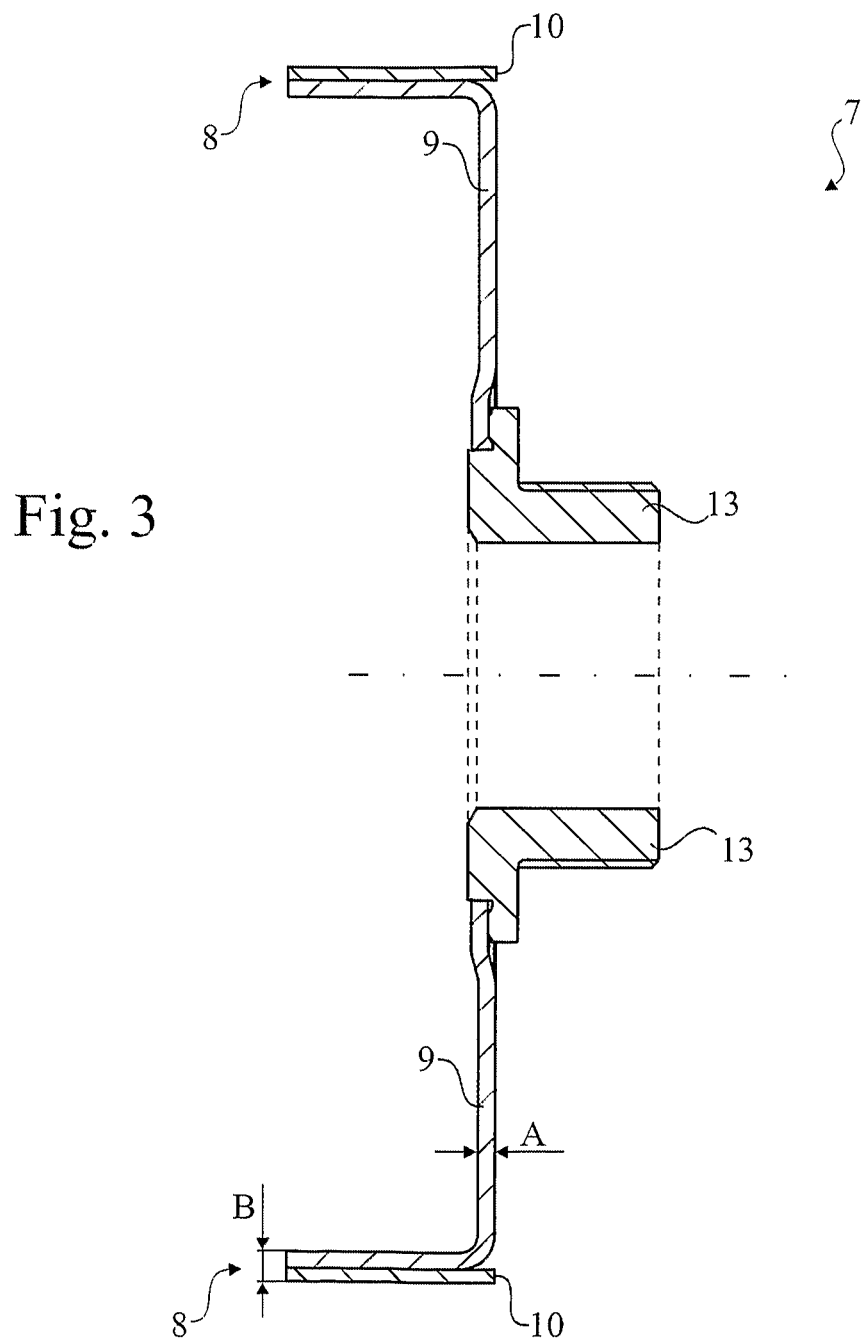
FIG. 3 is a cross sectional view of a clutch drum 7, according to second preferred embodiment of the invention.

FIG. 3 shows a clutch drum 7 and a drum hub 13 of a centrifugal clutch 4 according to second preferred embodiment of the invention. As for the embodiment described with reference to FIG. 2 the clutch drum 7 comprises an end portion 9 and a peripheral portion 8, but said peripheral portion 8 being composed of a first layer of sheet metal, and a second layer of a cylinder shaped ring 10 surrounding the first layer, so as to form a peripheral portion 8 having two layers. The two layers are permanently fixed by e.g. soldering. The sheet metal of the clutch drum 7 has the thickness 0.8 mm, and the ring has the thickness 1.0 mm, which implies that the peripheral portion 8 has the total thickness 1.8 mm and the end portion 9 has the thickness 0.8 mm. The thickness of the end portion 9 has proved to be sufficient although it is about half the thickness of a conventional end portion 9.

Figure 4:
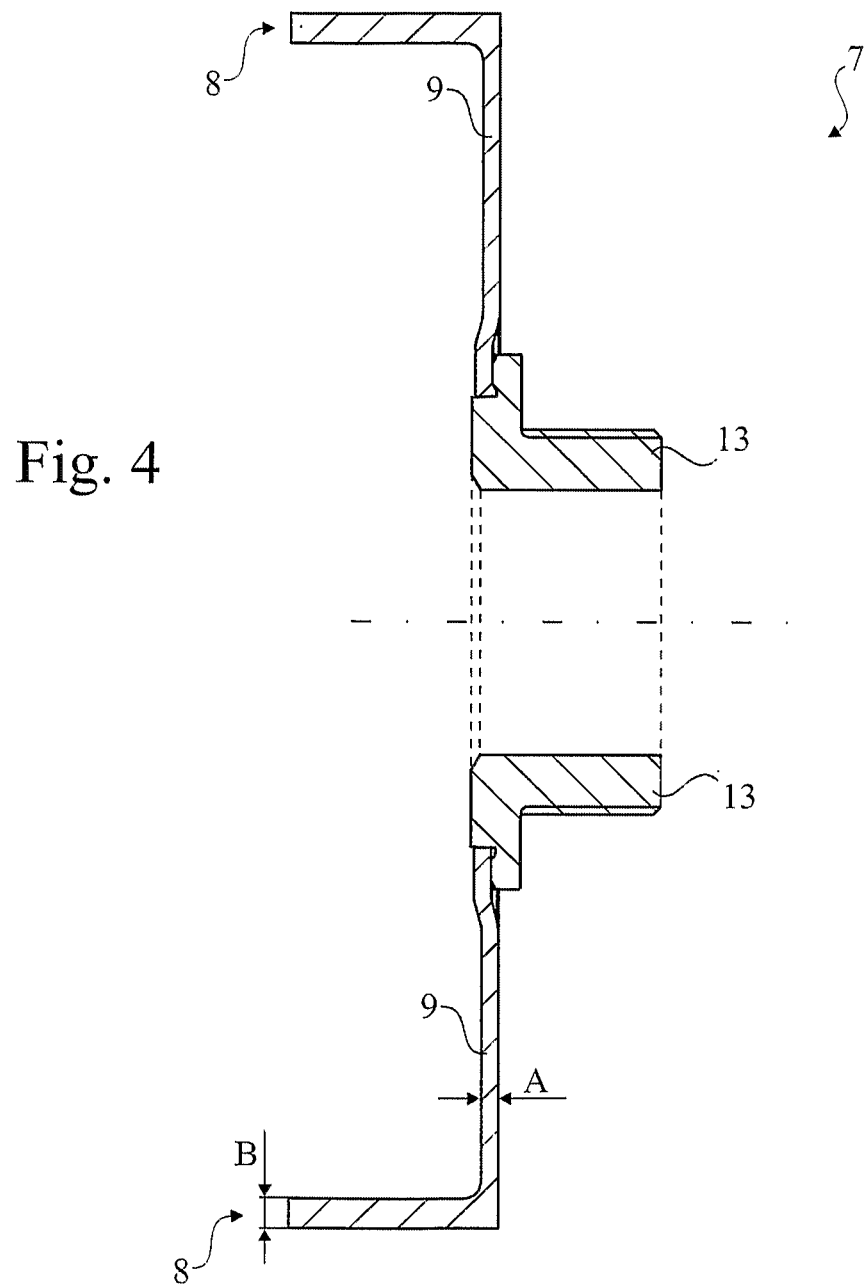
FIG. 4 is a cross sectional view of a clutch drum 7, according to third preferred embodiment of the invention.

FIG. 4 shows a clutch drum 7 and a drum hub 13 of a centrifugal clutch 4 according to a third preferred embodiment of the invention, which is similar to the embodiments described with reference to FIG. 2-3, except for that the clutch drum 7 is drawn from sheet metal of a thickness 1.8 mm and the thickness of the end portion 9 is reduced by maching, e.g. by turning in a lathe.

Figure 5:
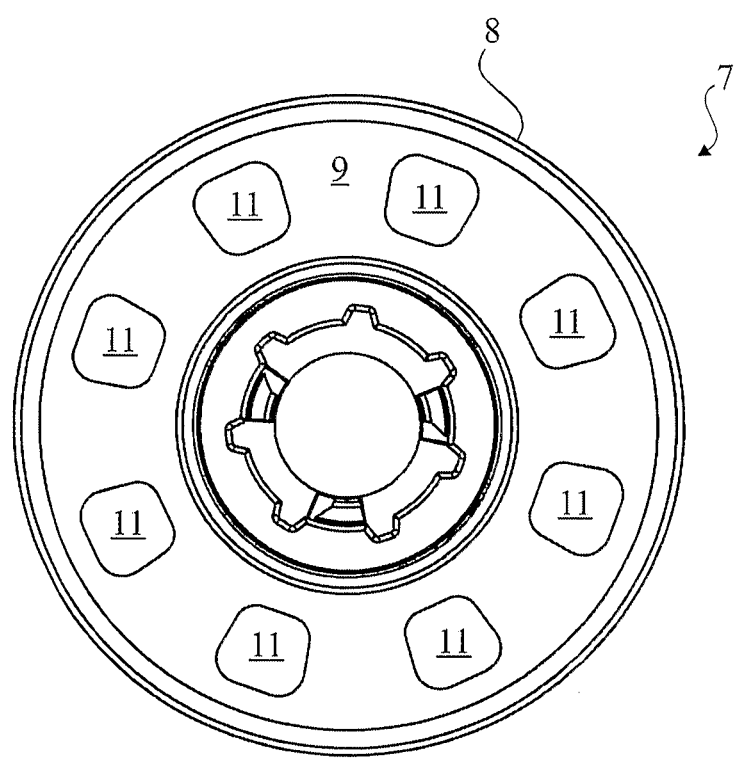
FIG. 5 shows an end portion 9 of a clutch drum 7.

FIG. 5 shows the end portion 9 of a clutch drum 7 having a number of weight saving cavities 11.

The invention claimed is:

1. A clutch drum being part of a centrifugal clutch for an internal combustion engine of a hand-held power tool, the centrifugal clutch being arranged to transmit a rotational motion of a crank shaft at higher engine speed and to declutch at lower engine speed, the clutch drum comprising:

a peripheral portion, with thickness B, which is arranged to be engaged on the inside by weighted arms of a driving disc at higher engine speed, an end portion, with thickness A, joining the peripheral portion and a drum hub, characterized in that the thickness A is less than the thickness B, wherein the end portion has sufficient rigidity to prevent tilting of the peripheral portion relative to a rotational axis of the clutch drum, and a brake band wound around an outer surface of the peripheral portion, the brake band configured to frictionally engage and stop the rotation of the peripheral portion.

2. The clutch drum according to claim 1, wherein A is less than 0.9 times B.

3. The clutch drum according to claim 1, wherein A is less than 0.7 times B.

4. The clutch drum according to claim 1, wherein A is less than 0.5 times B.

5. The clutch drum according to claim 1, wherein the clutch drum has been formed by drawing a sheet metal blank.

6. The clutch drum according to claim 5, wherein additional operations have been applied to the sheet metal of the peripheral portion, so as to create a peripheral portion at least partly being composed of two layers, one radially outer layer and a second radially inner layer, of said sheet metal.

7. The clutch drum according to claim 6, wherein the peripheral portion is composed so that the radially outer layer is wider than the radially inner layer.

8. The clutch drum according to claim 1, wherein an outer radius, at the position where the end portion meets the peripheral portion, is less than 0.8 times B.

9. The clutch drum according to claim 1, wherein an outer radius, at the position where the end portion meets the peripheral portion, is less than 0.8 times A.

10. The clutch drum according to claim 1, wherein a number of holes or cavities are applied to the end portion.

11. The clutch drum according to claim 1, wherein a cylinder shaped ring is fixedly fitted around the peripheral portion so as to create a peripheral portion being composed of a layer of sheet metal and a cylinder shaped ring, said layer of sheet metal and said cylinder shaped ring being permanently joined.

12. The clutch drum according to claim 11, wherein the peripheral portion is composed so that the layer of sheet metal and the cylinder shaped ring are permanently joined by soldering.

13. The clutch drum according to claim 1, wherein the thickness of the end portion is reduced by machining.

14. The clutch drum according to claim 1, wherein the thickness of the peripheral portion is reduced by machining.

15. The clutch drum according to claim 1, wherein the drum hub is arranged to be rotatably mounted on the crank shaft.

16. The clutch drum according to claim 15, wherein the drum hub is provided with a drive sprocket intended to drive a saw chain of a chainsaw.

17. The clutch drum according to claim 15, wherein the drum hub is provided with a belt pulley intended to drive a belt of a cut off machine.

18. The clutch drum according claim 1, wherein the drum hub is arranged to be fixedly mounted on an output shaft.

19. A centrifugal clutch comprising:
a clutch drum including:

a peripheral portion, with thickness B, which is arranged to be engaged on the inside by weighted arms of a driving disc at higher engine speed, and an end portion, with thickness A, joining the peripheral portion and a drum hub, wherein the end portion has sufficient rigidity to prevent tilting of the peripheral portion relative to a central axis of the clutch drum, characterized in that the thickness A is less than the thickness B; and a brake band wound around an outer surface of the peripheral portion, the brake band configured to frictionally engage and stop the rotation of the peripheral portion.

20. The centrifugal clutch according to claim 19 comprising:

a driving disc having weighted arms, which arms being held in by at least one spring and being forced outwards by the centrifugal force when the driving disc is rotating at higher engine speed, a hub, fixedly joining a crankshaft and the driving disc, a drum hub fixedly connected to the clutch drum for mounting to a shaft so as to be rotatable about a central axis.

21. An internal combustion engine, comprising a centrifugal clutch comprising:

a clutch drum having:

a peripheral portion, with thickness B, which is arranged to be engaged on the inside by weighted arms of a driving disc at higher engine speed, and an end portion, with thickness A, joining the peripheral portion and a drum hub, fixedly connected to the clutch drum for mounting to a shaft so as to be rotatable about a central axis, wherein the thickness A is less than the thickness B, wherein the end portion has sufficient rigidity to prevent tilting of the peripheral portion relative to the central axis, a driving disc having weighted arms, which arms being held in by at least one spring and being forced outwards by the centrifugal force when the driving disc is rotating at higher engine speed, a hub, fixedly joining a crankshaft and the driving disc, and a brake band wound around an outer surface of the peripheral portion, the brake band configured to frictionally engage and stop the rotation of the peripheral portion.

22. The clutch drum according to claim 1, wherein the peripheral portion includes two layers, one radially outer layer and a second radially inner layer and the two layers being formed from a single continuous piece of material.

* * * * *